United States Patent
Taylor et al.

(10) Patent No.: US 9,952,394 B2
(45) Date of Patent: Apr. 24, 2018

(54) OPTICAL MEASUREMENT APPARATUS AND METHOD OF MANUFACTURING THE SAME

(71) Applicant: Lein Applied Diagnostics Limited, Wokingham Berkshire (GB)

(72) Inventors: Robin Taylor, Purley-on-Thames (GB); James Reynolds, Rodborough (GB); Simon Meadowcroft, Stowmarket (GB)

(73) Assignee: Lein Applied Diagnostics Limited, Wokingham Berkshire (GB)

( * ) Notice: Subject to any disclaimer, the term of this patent is extended or adjusted under 35 U.S.C. 154(b) by 17 days.

(21) Appl. No.: 14/648,513

(22) PCT Filed: Nov. 26, 2013

(86) PCT No.: PCT/GB2013/053114
§ 371 (c)(1),
(2) Date: May 29, 2015

(87) PCT Pub. No.: WO2014/083324
PCT Pub. Date: Jun. 5, 2014

(65) Prior Publication Data
US 2015/0316733 A1   Nov. 5, 2015

(30) Foreign Application Priority Data
Nov. 29, 2012   (GB) .................................. 1221459.9

(51) Int. Cl.
*G02B 6/42*     (2006.01)
*G01J 1/04*     (2006.01)
(Continued)

(52) U.S. Cl.
CPC .......... *G02B 6/4246* (2013.01); *G01J 1/0425* (2013.01); *G02B 6/241* (2013.01);
(Continued)

(58) Field of Classification Search
CPC ............... G01J 1/0425; G02B 21/0032; G02B 27/1006; G02B 6/241; G02B 6/4202;
(Continued)

(56) References Cited

U.S. PATENT DOCUMENTS 5,760,901 A * 6/1998 Hill ...................... G02B 21/004
356/450
5,841,562 A   11/1998 Rangwala et al.
(Continued)

FOREIGN PATENT DOCUMENTS

EP            2108991 A1    10/2009

OTHER PUBLICATIONS

International Search Report and Written Opinion for related pct application PCT/GB2013/053114 dated Apr. 29, 2014.
(Continued)

*Primary Examiner* — Francis M Legasse, Jr.
(74) *Attorney, Agent, or Firm* — Bracewell LLP; Keith R. Derrington (57) ABSTRACT

An optical measurement apparatus (102) containing a bidirectional optical transceiver component (200), the bidirectonal optical transceiver component (200) comprising a source of optical electromagnetic radiation (208), an optical detector (214), a beamsplitter, and a combined input and output port (218). The port (218) is arranged to permit, when in use, propagation of optical electromagnetic radiation therethrough. The beamsplitter is aligned within a housing (206) with respect to the optical source (208), the optical detector (214) and the port (218) in order to direct optical electromagnetic radiation emitted by the optical source (214) to the port (214) and to direct optical electromagnetic radiation received from the port (214) to the optical detector (208).

21 Claims, 7 Drawing Sheets

(51) Int. Cl.
    *G02B 27/10*     (2006.01)
    *G02B 6/24*     (2006.01)
    *G02B 6/43*     (2006.01)
    *G02B 21/00*     (2006.01)

(52) U.S. Cl.
    CPC ......... *G02B 6/4202* (2013.01); *G02B 6/4212* (2013.01); *G02B 6/4277* (2013.01); *G02B 6/4298* (2013.01); *G02B 6/43* (2013.01); *G02B 21/0032* (2013.01); *G02B 27/1006* (2013.01); *Y10T 29/49004* (2015.01)

(58) Field of Classification Search
    CPC .. G02B 6/4212; G02B 6/4246; G02B 6/4277; G02B 6/4298; G02B 6/43; Y10T 29/49004
    See application file for complete search history.

(56) References Cited

U.S. PATENT DOCUMENTS

| | | |
|---|---|---|
| 6,181,474 B1 | 1/2001 | Ouderkirk et al. |
| 2006/0017920 A1 | 1/2006 | Tsuchiya et al. |
| 2007/0122154 A1 | 5/2007 | Nakanishi et al. |
| 2007/0172180 A1* | 7/2007 | Pillers ................ G02B 21/0032 385/115 |
| 2008/0075409 A1 | 3/2008 | Liu |

OTHER PUBLICATIONS

European Examination Report dated May 24, 2017 for corresponding European application No. 13817706.8.

\* cited by examiner

OPTICAL MEASUREMENT APPARATUS AND METHOD OF MANUFACTURING THE SAME

The present invention relates to an optical measurement apparatus of the type that, for example, comprises a bi-directional optical transceiver component. The present invention also relates to a method of manufacturing an optical measurement apparatus, the method being of the type that, for example, provides a bidirectional optical transceiver component.

In the field of confocal optical systems, a light source, a first pinhole, a second pinhole, and an optical detector are typically employed in order to illuminate a small surface or region under test and receive light reflected back from the surface or region under test. For such systems, it is necessary to align and control the light source, the pinholes and the optical detector with precision and it is desirable to do so in a simple and cost-effective manner. Indeed, the alignment tolerances of the above-mentioned elements of the system with respect to each other can be as low as less than one micrometre to a few hundred micrometres. As a consequence of this required precision, mechanical tolerances need to be comparable and fine motion of the pinhole is usually required in order to ensure that it is confocal with the surface or region under test.

In an attempt to obviate or at least mitigate the above-mentioned precision requirements associated with alignment of the elements, it is known to employ so-called "pigtailed" optical source and detector components and propagate their respective signals through a single fibre by coupling each component respectively to a branch of a Y-coupler and an optical fibre, constituting the "single fibre", to a remaining branch of the Y-coupler in such a way that the free end of the optical fibre serves as both a light source and a pinhole, thereby eliminating the need to align the components to one another. However, the coupling of the optical source and optical detector with the optical fibre is an additional technical problem that has to be addressed for this implementation.

In another known implementation of a confocal optical system described in U.S. Pat. No. 5,120,953 relating to the field of confocal microscopy, an optical fibre is also used to simplify the construction of the confocal optical system by using multiple optical fibres to connect a light source, a photodetector and a condenser lens. However, such an approach is overly complex as a first optical fibre connects the light source to a light separator, a second optical fibre connects the photodetector to the light separator and a third optical fibre provides a propagation path from the light separator to the condenser lens, particularly since care is required to ensure precise coupling of the optical fibres to each of the three elements mentioned above. Also, the coupling arrangement is also unsuitable for other applications requiring confocal optics, because the level of precision of measurement required exceeds that of the applications in the field of microscopy for which the above-described coupling arrangement has been designed. Also, the interfacing of the optical fibre from which light is emitted with other optical elements of the confocal optical system, for example a lens, is problematic.

In the field of fibre optic communications, a device known as a "bidirectional module" comprises a laser source, a photodetector, a beamsplitter and an optical fibre in a single module. An example of one such module is described in U.S. Pat. No. 5,841,562. The bidirectional module enables light both to be transmitted and received via the optical fibre, thereby simplifying alignment, which as described above is problematic.

However, the bidirectional module, as mentioned above, is used in the field of digital fibre optic communications and is unsuitable for other applications requiring confocal optics, because the Signal-to-Noise Ratio (SNR) requirements of the photodetector for digital systems are not compatible with analogue measurements where precision and stability over a range of signal values are required. Also, such a bidirectional module would be linked with another bidirectional module by a length of optical fibre, whereas in the field of confocal optics the optical fibre is terminated at the point where it interfaces with an optical system used to probe an object under test. The interfacing of the optical fibre from which light is emitted with other optical elements of the confocal optical system, for example a lens, is problematic. For example, optical reflections from the termination of the optical fibre can increase noise at the photodetector and can affect the stability of the laser source. Another source of noise in the bidirectional transceiver is crosstalk from the laser source to the photodetector within the bidirectional transceiver body, which again hinders performance when used in a confocal optical system.

According to the present invention, there is provided an optical measurement apparatus containing a bidirectional optical transceiver component, wherein the bidirectional optical transceiver component comprises: a source of optical electromagnetic radiation; an optical detector; a beamsplitter; and a combined input and output port arranged to permit, when in use, propagation of optical electromagnetic radiation therethrough; wherein the beamsplitter is aligned within the housing with respect to the optical source, the optical detector and the combined input and output port in order to direct optical electromagnetic radiation emitted by the optical source to the combined input and output port and to direct optical electromagnetic radiation received from the combined input and output port to the optical detector.

The bidirectional transceiver component may comprise an additional source of optical electromagnetic radiation. The additional source of optical electromagnetic radiation may be arranged to emit optical electromagnetic radiation having a different range of wavelengths to the range of wavelengths of optical electromagnetic radiation emitted, when in use, by the source of optical electromagnetic radiation.

The bidirectional optical transceiver component may comprise an additional optical detector.

The beamsplitter may be located within the bidirectional optical transceiver component to permit a first proportion of the received optical electromagnetic radiation from the combined input and output port to propagate towards the optical detector via the beamsplitter and to permit a second proportion of the optical electromagnetic radiation emitted from the source to propagate towards the combined input and output port via the beamsplitter; the first proportion may be numerically greater than the second proportion.

The beamsplitter may be arranged to direct more than 50% of the received optical electromagnetic radiation from the combined input and output port towards the optical detector. The beamsplitter may be arranged to direct more than 80% of the received optical electromagnetic radiation from the combined input and output port towards the optical detector.

The emitted optical electromagnetic radiation may have a first wavelength range associated therewith and received optical electromagnetic radiation may have a second wavelength range associated therewith; the first wavelength range may be substantially the same as the second wavelength range.

The emitted optical electromagnetic radiation has a first wavelength range associated therewith and the received optical electromagnetic radiation has a second wavelength range associated therewith; and the first and second wavelength ranges may be different.

The first and second wavelength ranges may overlap. The first and second wavelength ranges may not overlap.

The beamsplitter may be arranged to direct optical electromagnetic radiation in the second wavelength range towards the optical detector and direct optical electromagnetic radiation in the first wavelength range away from the optical detector.

An optical waveguide may be coupled to the combined input and output port at a first end thereof.

A second end of the optical waveguide may be exposed to free space.

An optical launch assembly may be disposed at a second end of the optical waveguide. The optical launch assembly may comprise a length of propagation medium abutting the second end of the optical waveguide.

The second end of the optical waveguide may be fusion spliced to a first end of the length of propagation medium.

The second end of the optical waveguide may be terminated by a ferrule; the ferrule may abut the length of propagation medium.

A second end of the optical waveguide may have a surface that may be perpendicular with respect to a longitudinal axis thereof.

The second end of the optical waveguide may be terminated by a polished surface in a plane substantially perpendicular to a longitudinal axis of the optical waveguide; a first end of the length of propagation medium may be terminated by a polished surface in a plane substantially perpendicular to a longitudinal axis of the length of propagation medium; and the second end of the optical waveguide may snugly abut the first end of the length of propagation medium.

A second end of the optical waveguide may have a surface that extends at a substantially non-perpendicular angle with respect to a longitudinal axis of the optical waveguide.

Additionally or alternatively, the second end of the optical waveguide may be polished.

The second end of the optical waveguide may have an antireflective coating.

The second end of the optical waveguide may be shaped to form a refractive or diffractive optical element. The refractive or diffractive optical element may comprise a lens.

A first end of the length of propagation medium may abut the second end of the optical waveguide and a portion of the length of propagation medium may be arranged to form a refractive or diffractive optical element.

A longitudinal portion of the length of propagation medium may be arranged to form the refractive or diffractive optical element.

A first end of the length of propagation medium may abut the second end of the optical waveguide and a second end of the length of propagation medium may be shaped to form a refractive or diffractive optical element.

A refractive index of the length of propagation material may be arranged substantially to match a refractive index of the optical waveguide.

The optical launch assembly may comprise a split sleeve substantially surrounding a portion of the length of propagation medium and the second end of the optical waveguide.

A joint between the optical waveguide and the length of propagation material may be filled with an index matching medium.

The length of propagation medium may be fused silica glass.

The optical waveguide may be an optical fibre. The optical fibre may be a single mode optical fibre.

An amplifier circuit may be operably coupled to the optical detector.

The apparatus may further comprise an offset compensator for compensating for optical crosstalk and/or optical interference; the amplifier circuit may be operably coupled to the offset compensator for offset control of the amplifier circuit.

The offset compensator may be arranged to receive an electrical feedback signal from the amplifier circuit and to adjust, when in use, an offset level applied to the amplifier circuit by the offset compensator.

The offset compensator may be an adjustable signal level generator.

The optical electromagnetic radiation emitted through the combined input and output port may be brought to a focus by one or more optical elements.

The one or more optical elements may comprise the optical waveguide and/or the optical launch assembly. For the avoidance of doubt, the one or more optical elements may comprise the refractive or diffractive optical element integrally formed with or coupled to the length of propagation medium and/or the optical waveguide.

The focus may be translated along an axis.

The apparatus may further comprise: a sample platform for a sample to be measured; wherein the sample platform may be translated in an axis relative to the focus.

The focus may be substantially static. The axis may be an optical axis.

The focus may be translated along a first axis orthogonal to an optical axis.

The focus may be translated along a second axis orthogonal to the optical axis and to the first axis.

The sample platform may be translated along a first axis orthogonal to the optical axis.

The sample platform may be translated along a second axis orthogonal to the first axis and the optical axis.

The source of electromagnetic radiation may be arranged to emit the optical electromagnetic radiation as an alternating signal.

The alternating signal may be a pulsed signal. The alternating signal may be a modulated signal.

The apparatus may further comprise another bidirectional optical transceiver component operably coupled to the bidirectional optical transceiver component.

An optical waveguide may be coupled to the combined input and output port at a first end thereof; and the another bidirectional optical transceiver component may comprise another combined input and output port and another optical waveguide coupled thereto at a first end thereof.

The optical waveguide may be operably coupled to the another optical waveguide.

The optical waveguide may be operably coupled to the another optical waveguide by a fibre coupler. The fibre coupler may be a 50/50 fibre coupler.

The apparatus may further comprise another bidirectional optical transceiver component comprising another detector, another beamsplitter, another combined input and output port and another optical waveguide coupled the another combined input and output port; wherein the optical waveguide may be in optical communication with the source of electromagnetic radiation and the optical detector via the beamsplitter; the another optical waveguide may be in optical communication with the another optical detector via the another beamsplitter; and the optical waveguide may be arranged to receive, when in use, optical electromagnetic radiation from the source of electromagnetic radiation and permit propagation therethrough, and the another optical waveguide may be arranged to receive at least part of the optical electromagnetic radiation emitted by the optical waveguide when reflected.

The at least part of the optical electromagnetic radiation reflected may propagate, when in use, through the another optical waveguide.

The another bidirectional optical transceiver component may comprise another source of electromagnetic radiation. The another optical waveguide may be in optical communication with the another source of electromagnetic radiation via the another beamsplitter. The another optical waveguide may be arranged to receive, when in use, optical electromagnetic radiation from the another source of electromagnetic radiation and permit propagation therethrough; and the optical waveguide may be arranged to receive at least part of the optical electromagnetic radiation emitted by the another optical waveguide when reflected.

The wavelength of optical electromagnetic radiation emitted by the source of optical electromagnetic radiation may be different to the wavelength of optical electromagnetic radiation emitted by the another source of optical electromagnetic radiation.

The beamsplitter of the bidirectional optical transceiver component may be a first dichroic beamsplitter and the another bidirectional optical transceiver component may comprise a second dichroic beamsplitter. The wavelength selectivity of the first and second dichroic beamsplitters may be selected so that, when in use, a wavelength of optical electromagnetic radiation output from the bidirectional optical transceiver component may be received by the another bidirectional optical transceiver component, and the wavelength of optical electromagnetic radiation output by the another bidirectional optical transceiver component may be received by the bidirectional optical transceiver component.

According to a second aspect of the present invention, there is provided a confocal optical measurement apparatus comprising the optical measurement apparatus as set forth above in relation to the first aspect of the invention.

According to a third aspect of the present invention, there is provided an optical metrology apparatus comprising the optical measurement apparatus as set forth above in relation to the first aspect of the invention.

The optical measurement apparatus may be a confocal optical measurement apparatus.

The apparatus may further comprise screening of the bidirectional optical transceiver component to reduce optical and/or electrical noise, thereby maximising sensitivity of the bidirectional optical transceiver component to an optical signal.

The screening may comprise an opaque baffle disposed within the bidirectional optical transceiver component. The screening may comprise a light absorbing surface disposed within the bidirectional optical transceiver component. The screening may comprise an opaque enclosure surrounding at least part of the bidirectional optical transceiver component. The screening may comprise electromagnetic shielding disposed about the source of optical electromagnetic radiation and/or the optical detector. The screening may comprise electromagnetic shielding disposed about the amplifier circuit and/or the offset compensator.

According to a fourth aspect of the present invention, there is provided an interferometer comprising the optical measurement apparatus as set forth above in relation to the first aspect of the invention.

According to a fifth aspect of the present invention, there is provided an method of manufacturing an optical measurement apparatus, the method comprising: providing an optical measurement assembly; coupling a bidirectional optical transceiver component to the optical measurement assembly.

It is thus possible to provide a method of manufacturing that results in an optical measurement apparatus and an optical measurement apparatus that benefit from improved SNR and hence improved sensitivity, whilst ensuring good and reliable alignment of the optical source and the photodetector with the optical fibre. Additionally, a more compact format for a confocal optical system is achieved over a bulk optical system as well as improved environmental performance and reduced complexity. The cost of manufacture of the optical measurement apparatus is also reduced as compared with a bulk optical system.

At least one embodiment of the invention will now be described, by way of example only, with reference to the accompanying drawings, in which.

Throughout the following description identical reference numerals will be used to identify like parts.

Figure 1:
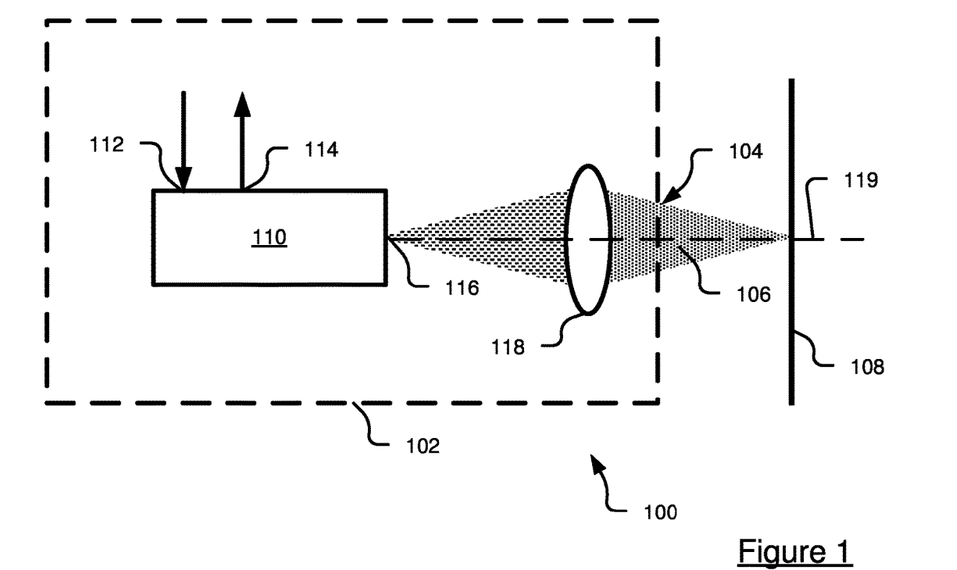
FIG. 1 is schematic diagram of an optical measurement system comprising a bidirectional optical transceiver unit of an optical measurement apparatus, and an object under test.

Referring to FIG. 1, an optical measurement system 100 comprises an optical measurement apparatus 102. In this example, the optical measurement apparatus 102 is confocal. The apparatus is provided to measure the thickness of a contact lens. However, the skilled person should appreciate that the optical measurement apparatus 102 can be used in relation to other aspects of metrology, for example to measure the position of a surface or thickness of other items, such as other transparent objects or parts thereof, including transparent parts of the human or animal body. In this respect, the optical measurement apparatus 102 can be used, for example, to make a measurement, such as a thickness measurement, in relation to a cornea, a lens, or artificial collagen, or a position of a non-transmissive surface.

The optical measurement apparatus 102 has an output 104 from which electromagnetic radiation, for example output light 106, is focussed onto a focal plane 108. The focal plane lies in or on the object to be measured (hereinafter referred to as an "object under test"). The optical measurement apparatus 102 comprises a bidirectional optical transceiver unit 110 having a power connection 112 for coupling to a power supply (not shown) and a data connection 114 for coupling to a data processing module (also not shown). In order not to distract from the core teachings of the embodiments set forth herein, details of the power supply and the data processing module will not be described further. However, the skilled person will be aware of suitable hardware to power the bidirectional optical transceiver unit 110 and hardware to process data output from the bidirectional optical transceiver unit 110.

Figure 2:
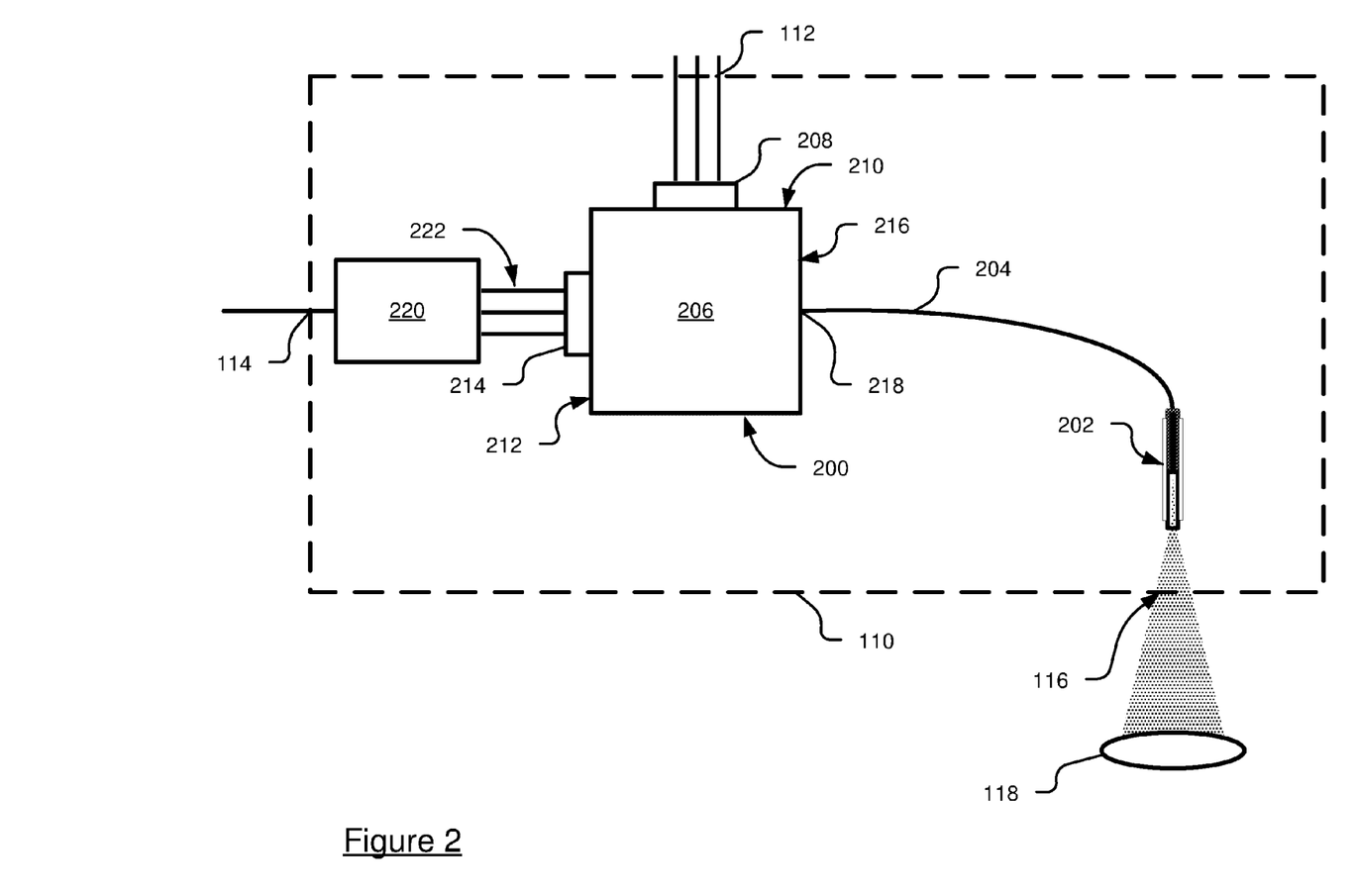
FIG. 2 is a schematic diagram of an optical measurement system of FIG. 1 but showing the bidirectional optical transceiver unit in greater detail and constituting an embodiment of the invention.

The bidirectional optical transceiver unit 110 comprises, in this example an optical output port 116. A focussing lens 118 of the optical measurement apparatus 102, or lens assembly, is disposed in an optical axis 119, the output of the optical measurement apparatus 102 and the optical output port 116 also being substantially centred about the optical axis 119. In this example, the focussing lens 118 or lens assembly constitutes part of an optical measurement assembly that is provided and operably coupled to a bidirectional optical transceiver component 200 (FIG. 2). It should be appreciated that the bidirectional optical transceiver is formed as a component, for example a closed component, as opposed to a free space implementation thereof.

Turning to FIG. 2, the bidirectional transceiver unit 110 comprises the bidirectional optical transceiver component 200, which is operably coupled to an optical launch assembly 202 via an optical waveguide, for example an optical fibre 204, such as a single mode optical fibre, serving as a so-called "fibre pigtail". The bidirectional optical transceiver component 200 comprises a housing or chassis 206, which in this example is generally cube-shaped, and is coupled to a source of optical electromagnetic radiation, for example a diode 208, such as a Superluminescent Light Emitting Diode (SLED), sealingly disposed with respect to a first side wall 210 of the housing 206. Of course, the skilled person will appreciate that other suitable light sources can be employed, for example a laser or laser diode. An optical detector, for example a photodetector 214 is sealingly disposed with respect to a second side wall 212 of the housing 206. The first side wall 210 is located substantially perpendicularly to the second side wall 212. The housing 206 also comprises a third side wall 216 having a fibre or "pinhole" port 218 constituting a combined input and output port, the optical fibre 204 being sealingly coupled to the fibre port 218 at a first end thereof.

The photodetector 214 is coupled to an electrical amplifying and biasing circuit 220 via first internal electrical connections 222, the biasing circuit 220 having an output coupled to the data connection 114. The power connection 112 is coupled to the diode 208.

The optical launch assembly 202 is disposed opposite the optical output port 116 of the optical measurement apparatus 102.

Figure 3:
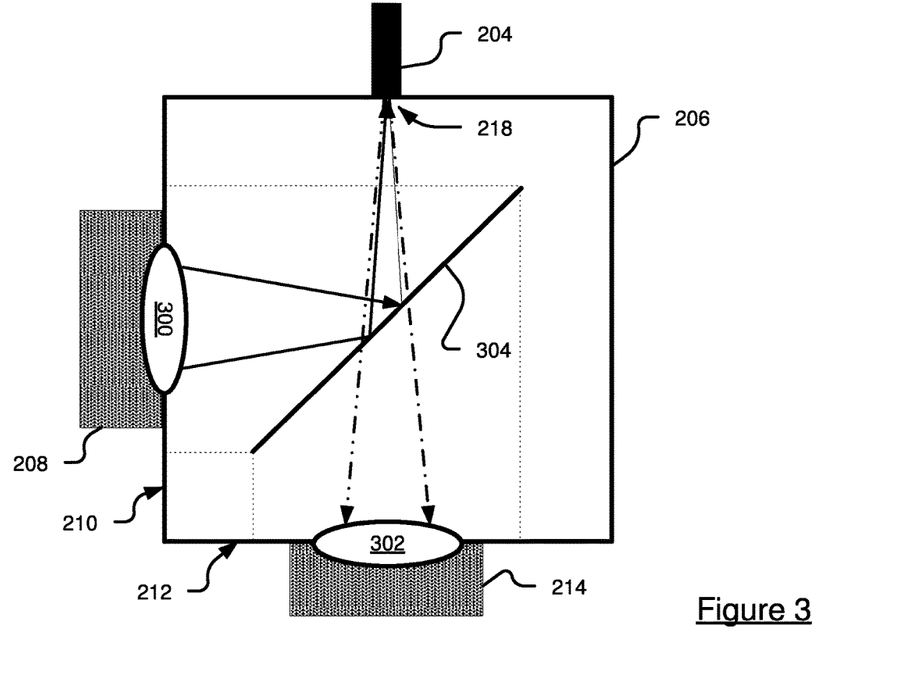
FIG. 3 is a schematic diagram of a bidirectional optical transceiver component of the bidirectional optical transceiver unit of FIG. 2.

Referring to FIG. 3, the housing 206, as described above, comprises the diode 208 operably coupled to the first side wall 210 thereof. In this example, the first side wall 210 of the housing 206 comprises a first aperture in which a first port lens 300 is sealingly disposed. As described above, the housing 206 also comprises the photodetector 214 disposed in the second side wall 212, the second side wall 212 of the housing 206 comprising, in this example, a second aperture in which a second port lens 302 is sealingly disposed. In this example, the first port lens 300 is a converging lens, and the second port lens 302 is also a converging lens.

The bi-directional optical transceiver component 200 also comprises a beamsplitter 304, for example a dichroic beamsplitter, disposed within the housing 206. The first aperture, the second aperture, the fibre port 218 and the beamsplitter 304 are aligned in a manner such that, in this example, a proportion of focussed light entering the housing 206 from the diode 208 is reflected towards the fibre port 218 and a proportion of light entering the housing 206 via the fibre port 218 propagates through the beamsplitter 304 to the second port lens 302 for illumination of the photodetector 214. The beamplitter 304 is therefore aligned within the housing 206 with respect to the optical source 208, the optical detector 214 and the combined input and output port 218 in order to direct optical electromagnetic radiation emitted by the optical source 208 to the combined input and output port 218 and direct electromagnetic radiation received from the combined input and output port 218 to the optical detector 214. In order to prevent incidence of light entering via the first port lens 300 reaching the photodetector 214, the propagation path between the first port lens 300 and the beamsplitter 304 and the propagation path between the beamsplitter 304 and the photodetector 214 are enveloped by respective first and second light seals.

Although, in the above example, the first and second port lenses 300, 302 are described as coupled to the housing 206, it should be appreciated that the first and/or second port lenses 300, 302 can be operably coupled to the housing 206 in a spaced manner with respect to the respective aperture, but disposed within an outer casing, for example a so-called Transistor outline (TO) "can", which can be provided to surround the housing 206.

The bidirectional optical transceiver component 200 can also be screened in other ways in order to reduce optical and/or electrical noise, thereby minimising sensitivity of the bidirectional optical transceiver component to potentially interfering optical signals.

In this example, the screening is an opaque baffle disposed within the bidirectional optical transceiver component 200. A light absorbing surface can also be disposed within the bidirectional optical transceiver component 200. An opaque enclosure can also be provided to surround at least part of the bidirectional optical transceiver component 200. The screening can comprise electromagnetic shielding disposed about the source of optical electromagnetic radiation 208 and/or the optical detector 214. The screening can comprise electromagnetic shielding disposed about an amplifier circuit and/or an offset compensator of an electrical amplifying and biasing circuit (not shown in FIG. 3).

Of course, the skilled person should appreciate that a converse arrangement to that described above can be employed. In this regard, the first aperture, the second aperture, the fibre port 218 and the beamsplitter 304 can be arranged and aligned so that focussed light entering the housing 206 from the diode 208 propagates through the beamsplitter 304 to the fibre port 218 and light entering the housing 206 via the fibre port 218 is reflected towards the second port lens 302 for illumination of the photodetector 214.

In relation to both implementations, it is necessary to select or set properties of the beamsplitter 304 so as to ensure that losses in relation to light incident upon the photodetector 214 are minimised. To this end, the power requirements of light used to illuminate the object under test are sufficiently low to permit the properties of the beamsplitter 304 to be skewed or biased in favour of the light reflected by the object under test incident upon the beamsplitter 304. To this end, proportionally, more light is directed from the fibre port 218 to the photodetector 214 than from the diode 208 to the fibre port 218. For example, the beamsplitter 304 may be arranged to direct more than 50% of the received optical electromagnetic radiation from the combined input and output port 218 towards the optical detector 214. The beamsplitter 304 may be arranged to direct more than 80% of the received optical electromagnetic radiation from the combined input and output port 218 towards the optical detector 214. In this example, the transmission-to-reflection ratio is about 99.5:0.5, but can be between about 99.5:0.5 and about 80:20 for example between about 99.5:0.5 and about 90:10, such as between about 99.5:0.5 and about 95:5. In relation to the converse arrangement mentioned above, these proportions can be reversed, i.e. the reflection component is the dominant component. However, it should be appreciated that in such an embodiment appropriate precautions need to be taken in order to protect against faulty beamsplitters that can result in an uncontrolled amount of light propagating through the beamsplitter 304 and entering the optical fibre 204.

In this example, the emitted optical electromagnetic radiation has a first wavelength range associated therewith and the received optical electromagnetic radiation has a second wavelength range associated therewith and the first and second ranges of optical electromagnetic radiation ranges are substantially the same. However, in another embodiment, the first and second ranges of optical electromagnetic radiation can be different, and optionally non-overlapping. Where different ranges of optical electromagnetic radiation are employed, the beamsplitter 304 can be selected and/or fabricated to possess the property of directing optical electromagnetic radiation in the first range away from the detector and optical electromagnetic radiation in the second range towards the optical detector or vice versa.

The above examples of the bidirectional optical transceiver component 200 comprise a single source of optical electromagnetic radiation and a single optical detector. However, the skilled person should appreciate that bidirectional optical transceiver component 200 can be configured in different ways, for example the bidirectional optical transceiver component can comprise an additional source of optical electromagnetic radiation. In such a configuration, the additional source of optical electromagnetic radiation can be capable of emitting optical electromagnetic radiation having a different range of wavelengths of optical electromagnetic radiation to the range of optical electromagnetic radiation emitted by the source of optical electromagnetic radiation described above. Similarly, the bidirectional optical transceiver component can comprise an additional optical detector.

Figure 4:
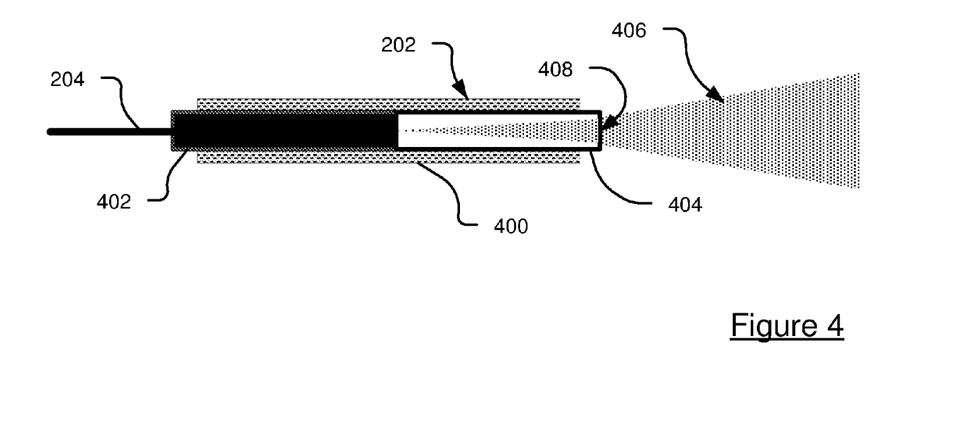
FIG. 4 is a schematic diagram of an optical launch assembly of the bidirectional transceiver unit of FIG. 2 in greater detail.

Turning to FIG. 4, the optical fibre 204 has the optical launch assembly 202 operably coupled thereto at a second end thereof. The optical launch assembly 202 comprises a split sleeve 400, the split being parallel to a longitudinal axis of the optical fibre 204. The split sleeve 400 holds a ferrule 402 and a length of propagation medium, for example a transparent rod, such as a silica rod 404 formed from fused silica glass. In this respect, the split sleeve 400 substantially surrounds a portion of this silica rod 404 and the second end of the optical fibre 204. The ferrule 402 and the silica rod 404 are arranged end-to-end within the split sleeve 400, an end of the ferrule 402 snugly abutting an end of the silica rod 404. The ferrule 402 and the silica rod 404 are fixed within the split sleeve 400 using an index matching resin (not shown) that is disposed between the abutting ends of the ferrule 402 and the silica rod 404.

The ferrule 402 surrounds and holds the optical fibre 204 at the second end thereof. The length of propagation medium therefore abuts the second end of the optical waveguide. The second end of the optical fibre 204 is terminated by a polished surface in a plane substantially perpendicular to a longitudinal axis (when notionally bend-free) of the optical fibre 204. An end surface of the ferrule 402 resides in the same plane as the termination surface of the optical fibre 204 so as to be substantially flush with the termination surface of the optical fibre 204. A refractive index of the silica rod 404 substantially matches a refractive index of the optical fibre 204. In another example, the second end of the optical fibre 204 is fusion spliced to the first end of the silica rod 404.

A first end of the length of the silica rod 404 is terminated by a polished surface in a plane substantially perpendicular to a longitudinal axis of the silica rod 404 and hence parallel to plane of the termination surfaces of the ferrule 402 and the optical fibre 204. The second end of the optical fibre 204 therefore snugly abuts the first end of the silica rod 404.

Although, in the above examples, the second end of the optical fibre 204 is terminated by a surface that is substantially perpendicular to the longitudinal axis thereof, in another example the second end of the optical fibre 204 has a surface that extends at a substantially non-perpendicular angle with respect to a longitudinal axis of the optical fibre 204. In this example, the surface can also be polished.

In another embodiment, an output end 408 of the optical launch assembly 202 comprises a diffractive or refractive optical element, comprising for example a lens (not shown) or other optical feature, for example a grating. In this respect, the lens can be coupled to the exposed end of the silica rod 404 or integrally formed therewith. In a further embodiment, the optical launch assembly 202 is not employed and so the free end of the optical fibre 204 is exposed to free space or terminated by a suitable diffractive or refractive optical element comprising, for example a lens or other optical feature, for example a grating, either integrally formed with the optical fibre 204 or coupled thereto.

In another example, irrespective of whether or not the end of the silica rod 404 comprises a refractive or diffractive optical element, a portion of the silica rod 404 can be arranged to form another refractive or diffractive optical element.

In relation to the provision of diffractive or refractive optical elements, these can be provided by arranging a portion of the silica rod 404 to form the refractive or diffractive optical element. In another example, the second end of the silica rod 404 can be shaped to form the refractive or diffractive optical element.

Although not mentioned in the examples set forth above, the skilled person should appreciate that the second end of the optical fibre 204 can carry an antireflective coating.

Figure 5:
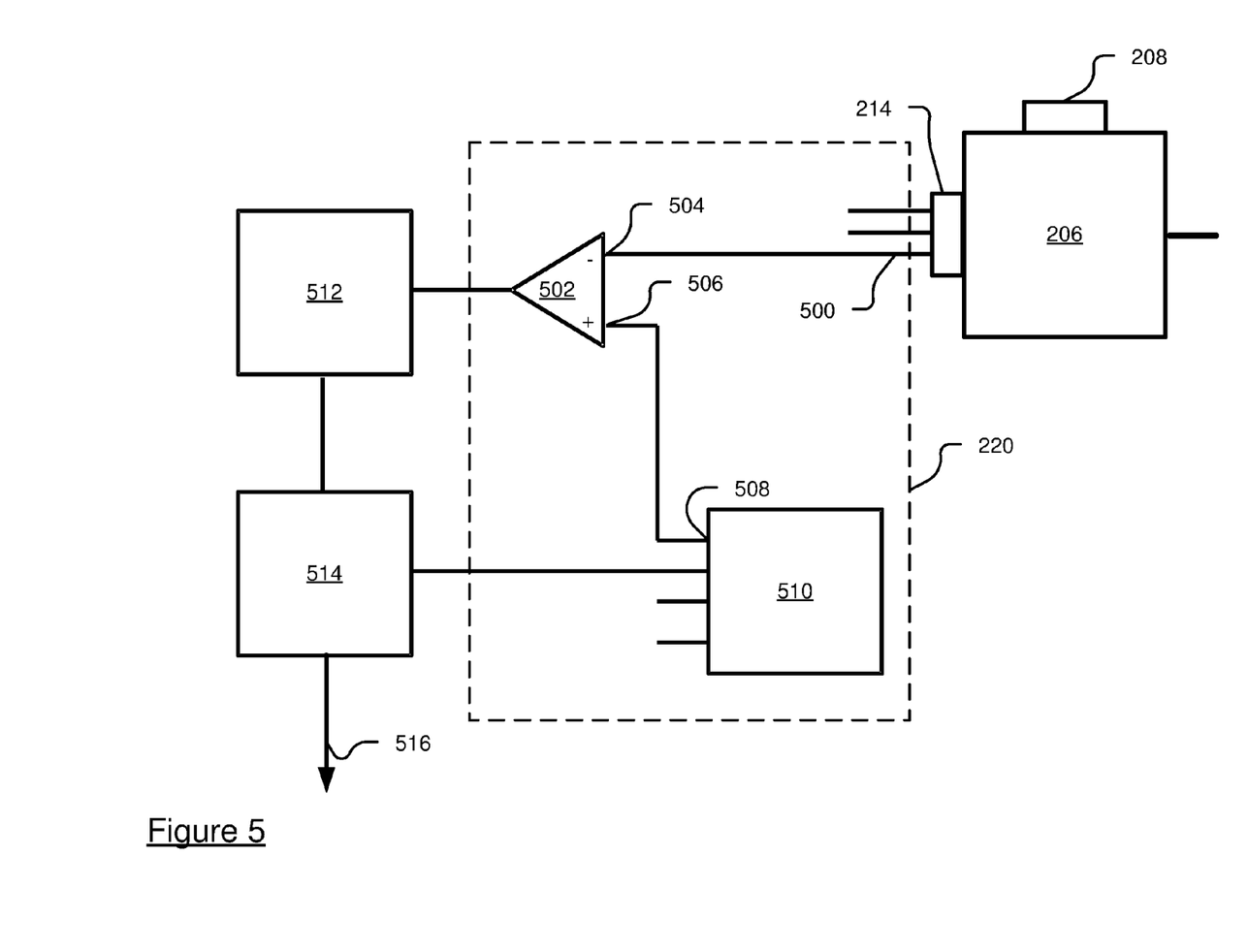
FIG. 5 is a schematic diagram of a biasing circuit of the bidirectional optical transceiver unit of FIG. 2 in greater detail.

Referring to FIG. 5, and as also set forth above in relation to FIG. 2, the amplifying and biasing circuit 220 is operably coupled to the photodetector 214 of the bidirectional optical transceiver component 200. In this regard, an output terminal 500 of the photodetector 214 is coupled to an amplifying circuit 502, for example a transimpedance amplifier. An inverting input terminal 504 of the transimpedance amplifier 502 is coupled to the output terminal 500 of the photodetector 214. One of the remaining terminals of the photodetector 214, in this example, is operably coupled to the case of the photodetector 214 and to ground potential, the other remaining terminal, in this example, is operably coupled to an anode terminal and a power source, for example a +5V power source. A non-inverting input 506 of the transimpedance amplifier 502 is operably coupled to a bias output terminal 508 of an offset compensation unit 510. In this example, the offset compensation unit 510 is a circuit arranged to generate an adjustable bias voltage signal via the bias output terminal 508 and comprises a digital-to-analogue converter circuit. The transimpedance amplifier 502 is coupled to an analogue-to-digital converter 512, the analogue-to-digital converter 512 being coupled to a microcontroller 514. The microcontroller 514 is coupled to the offset compensation unit 510 and also comprises a digital signal output 516.

Figure 6:
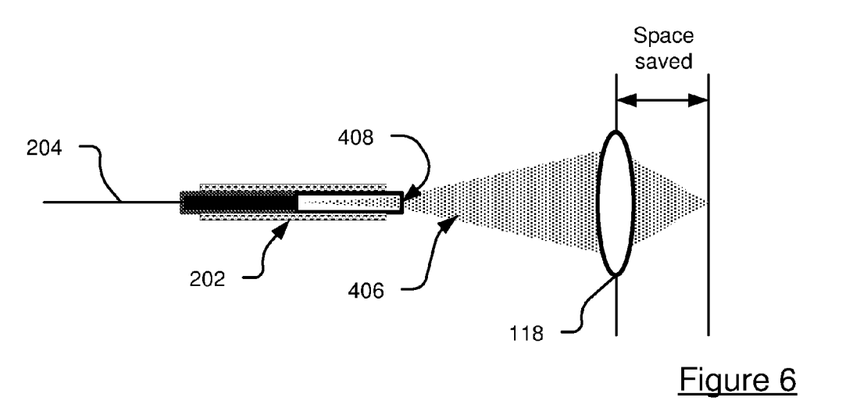
FIG. 6 is another schematic diagram of the optical launch assembly of FIG. 2 in greater detail.

In operation, the bidirectional optical transceiver unit 110 is powered up and the diode 208 emits light in response to a driving signal applied thereto from a driver circuit (not shown). The light emitted by the diode 208 is incident upon the beamsplitter 304 and reflected substantially perpendicularly towards the fibre port 218 and hence launched into the optical fibre 204. Due to the reflection-to-transmission ratio of the beamsplitter 304, about 0.5% of the optical power incident upon the beamsplitter 304 is reflected towards the fibre port 218, the remainder being unreflected and absorbed by the light seals of the bidirectional optical transceiver component 200. The light launched into the optical fibre 204 propagates therealong and, in this example, crosses from the second end of the optical fibre 204 in the optical launch assembly 202 to the silica rod 404. Referring briefly to FIG. 6, the silica rod 404 is formed as already described above in order to obviate or substantially mitigate reflections of emitted light by the end of the optical fibre 204 back to the photodetector 214. If such a measure is not provided, the back-reflected light propagates to the photodetector 214 and is subsequently detected, thereby increasing a power level above which an electrical signal of interest (described in more detail later herein), associated with light reflected by the object under test, must be in order to be detected. In this respect, an additional 4% optical signal would be returned to the photodetector 214, thereby representing the increased power level mentioned above that greatly exceed the power level of the optical signals reflected back from the object under test. Also, if a laser is used as the optical source 208, an interferometer would be created, thereby creating false peaks and troughs in the electrical signal of interest.

The light propagating through the silica rod 404 exits the exposed end of the silica rod 404 as a divergent beam of light 406. The divergent output beam of light 406 is then incident upon the focussing lens 118 for illumination of the object under test. Light incident upon the object under test is then scattered and reflected, a proportion of the reflected light passing back through the focussing lens 118 and then propagating to the optical launch assembly 202, whereupon the reflected light propagates along the silica rod 404 and a proportion thereof is launched into the second end of the optical fibre 204 adjacent the silica rod 404, the remaining unlaunched light constituting loss. The reflected light then propagates along the optical fibre 204 to the fibre port 218 whereupon the reflected light propagates towards the beamsplitter 304. Due to the reflection-to-transmission ratio of the beamsplitter 304 about 99.5% of the optical power of the light incident upon the beamsplitter 304 is permitted to propagate through the beamsplitter 304 towards the photodetector 214, whereupon the light irradiating the photodetector 214 is converted to electrical energy (the electrical signal of interest) with some loss of signal due to inefficiencies in the quantum mechanical conversion process, resulting in an electrical output signal.

In this example, the optical electromagnetic radiation 106 has been brought to a focus by the focussing lens 118. However, the skilled person should appreciate that the optical electromagnetic radiation can be brought to a focus by one or more optical elements, for example an optical element formed on or with the silica rod 404 either alone or in combination with the optical fibre 204, focussing lens 118 and/or any other optical system. Similarly, in the event that a free space implementation is employed, the one or more optical element can be formed on or integrally with the optical fibre 204 and used alone or in combination with the focussing lens 118 and/or any other optical system. In another embodiment, the one or more optical elements comprise the optical fibre 204 and/or the optical launch assembly 202.

Figure 7:
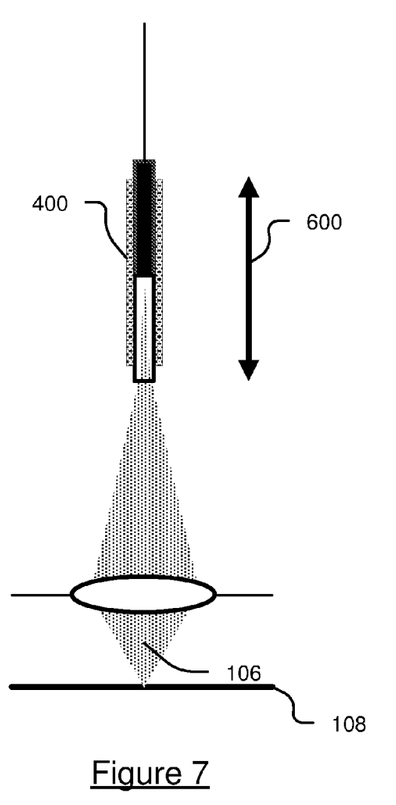
FIG. 7 is a schematic diagram of a scanning implementation employed by the optical measurement system of FIG. 1.
Figure 8:
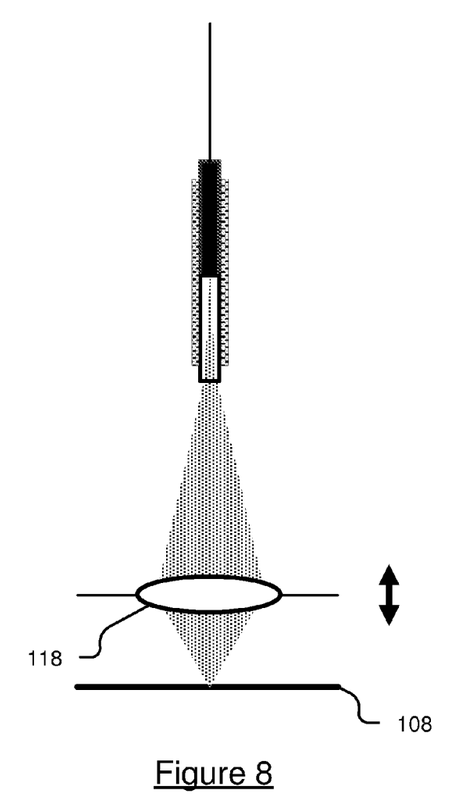
FIG. 8 is a schematic diagram of another scanning implementation employed by the optical measurement system of FIG. 1.
Figure 9:
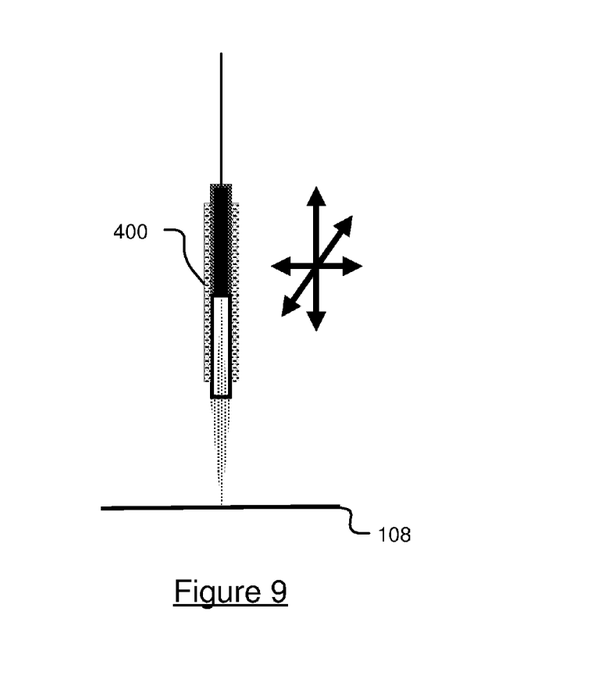
FIG. 9 is a schematic diagram of a beam relative translation implementation employed by the optical measurement system of FIG. 1.

Referring to FIG. 7, when used for active illumination of the object under test, the focus of the optical electromagnetic radiation 106 is translated along an axis when making one or more measurements, which in this example is an optical axis 600 of the optical measurement apparatus 102. This can be achieved by translating the optical launch assembly 400 in the optical axis 600 or translating the focussing lens 118 in the optical axis 600 (FIG. 8). However, the axis in which the focus is translated need not be the optical axis and the axis can be a first axis orthogonal to the optical axis. Alternatively or additionally, the focus can be translated along a second, different, axis that is orthogonal to both the first axis and the optical axis (FIG. 9).

In another example (FIG. 10), instead of translating the focus, i.e. the focus remains substantially static, the object under test 108 can be translated instead, for example by placing the object under test 108 on a translatable sample platform 602, the object under test 108 constituting a sample to be measured. The platform is translatable relative to the focus of the optical electromagnetic radiation 106.

Figure 10:
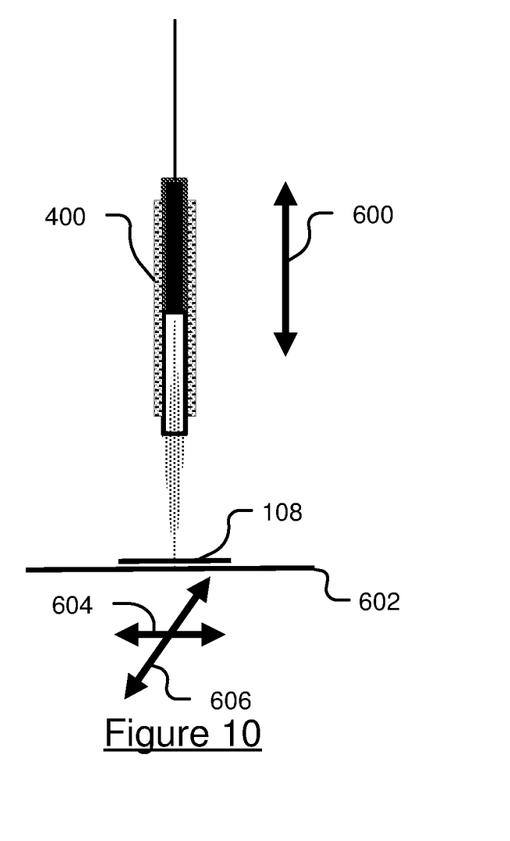
FIG. 10 is a schematic diagram of another beam relative translation implementation employed by the optical measurement system of FIG. 1.

In such as implementation, the sample platform is translated in an axis that is the optical axis 600 of the optical measurement apparatus 102. However, the platform can be translated along a first axis orthogonal to the optical axis 600, and/or a second axis orthogonal to both the first axis and the optical axis 600. A combined implementation can even be employed, whereby the optical launch assembly 202 is translated in the optical axis 600 and the sample platform 602 is translated in a first axis 604 orthogonal to the optical axis 600 and/or a second axis 606 orthogonal to the optical axis 600.

In relation to processing of the electrical output signal, when no target is present, for example the object under test 108, an internal reflected optical signal received by the photodetector 214 represents cross-talk in respect of the optical system, and so the electrical output signal has a level offset that needs to be reduced by the biasing circuit 220. The electrical output signal is firstly amplified by the transimpedance amplifier 502 and then the analogue-to-digital converter 512 samples the amplified electrical output signal to yield a digital value that is read by the microcontroller 514. This value represents an offset level calibration, which is then programmed by the microcontroller 514 into the offset compensation unit 510. In response to being programmed by the microcontroller 514, the offset compensation unit 510 generates an analogue compensation voltage level that is dynamically adapted throughout processing of the electrical output signal. In this example, the dynamic adaptation is performed during operation of the optical measurement apparatus 102, but when no target is present and hence when the optical measurement apparatus 102 is not actively making measurements (as opposed to merely performing calculations). The analogue compensation voltage level is then applied to the non-inverting input 506 of the transimpedance amplifier 502 for use during measurement. Of course, in other examples, the dynamic adaptation can take place during active making of measurements by the optical measurement apparatus 102. The transimpedance amplifier 502, receiving the electrical output signal from the optical detector 214, applies the analogue compensation voltage level to the electrical output signal, thereby reducing the bias level of the electrical output signal. Offset control of the transimpedance amplifier 502 is therefore exercised. The reduced offset of the electrical output signal maximises the dynamic range and improves the SNR of the electrical output signal and hence maximises sensitivity of the bidirectional optical transceiver unit 110 to the reflected light received. The microcontroller 514 provides a digital representation of the electrical output signal of interest via the digital signal output 516, the digital representation of the electrical output signal of interest being used for application-specific further processing. However, in order not to distract from the primary functionality of the examples herein, the application-specific further processing will not be described in further detail.

Figure 11:
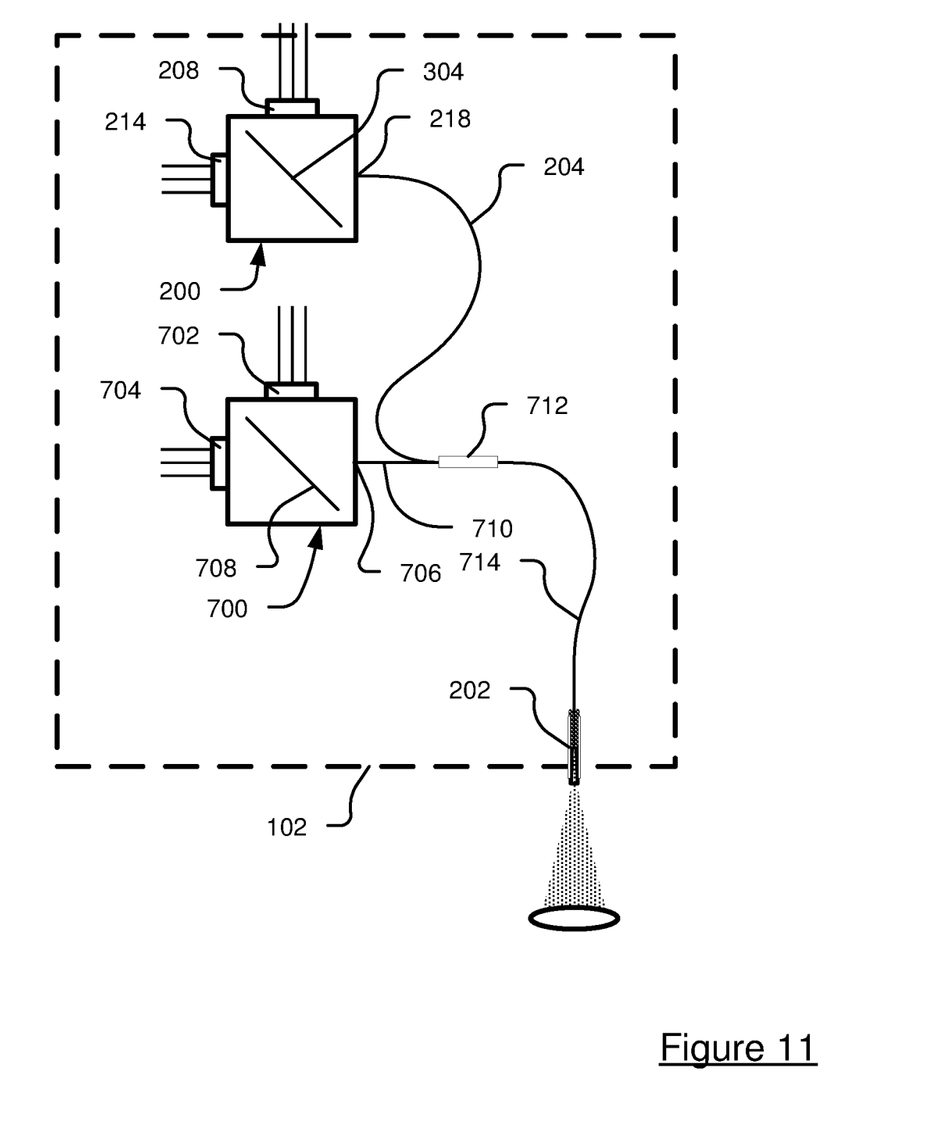
FIG. 11 is a schematic diagram of the optical measurement apparatus constituting another embodiment of the invention.

Turning to FIG. 11, in another embodiment the optical measurement apparatus 102 also comprises another bidirectional optical transceiver component 700, the another bidirectional optical transceiver component 700 comprising another source of optical electromagnetic radiation 702, another optical detector 704, another combined input and output port 706, and another beamsplitter 708, for example another dichroic beamsplitter. Another optical waveguide 710, for example another optical fibre, is coupled at a first end thereof to the another combined input and output port 706. In this example, the constituent parts of the another bidirectional optical transceiver component 700 are arranged in a like manner to the bidirectional optical transceiver component 200 described above. However, the source of optical electromagnetic radiation 208 is arranged to emit optical electromagnetic radiation having a first wavelength and the another source of optical electromagnetic radiation 702 is arranged to emit optical electromagnetic radiation having a second wavelength. It should therefore be appreciated that the first and second wavelengths of optical electromagnetic radiation are different. Similarly, the optical detector 214 is arranged to detect optical electromagnetic radiation of the second wavelength and the another optical detector 704 is arranged to detect optical electromagnetic radiation of the first wavelength.

The second end of the optical fibre 204 is operably coupled to the second end of the another optical fibre 710 by a fibre coupler 712 at a first end thereof, the bidirectional optical transceiver component 200 thereby being coupled to the another bidirectional optical transceiver component 700. In this example, the fibre coupler is a 50/50 fibre coupler.

A first end of a further optical waveguide 714, for example a further optical fibre, is coupled to a second end of the fibre coupler 712. In this example, the optical launch assembly 202 is disposed at the second end of the further optical fibre 714.

The optical fibre 204 is in optical communication with the source of optical electromagnetic radiation 208 via the beamsplitter 304 and the another optical fibre 710 is in optical communication with the another source of optical electromagnetic radiation 704 via the another beamsplitter 708. As such, when in operation, the optical fibre 204 is capable of receiving optical electromagnetic radiation from the source of optical electromagnetic radiation 208 and permit propagation of the received optical electromagnetic radiation therethrough. The another optical fibre 710 is also capable of receiving at least part of the optical electromagnetic radiation emitted by the optical fibre 204 when reflected following output via the optical launch assembly 202. In this respect, the at least part of the optical electromagnetic radiation reflected may propagate through the another optical fibre 710.

Similarly, the another optical fibre 710 is capable of receiving optical electromagnetic radiation from the another source of electromagnetic radiation 702 and permit propagation of the received optical electromagnetic radiation therethrough. The optical fibre 204 is also capable of receiving at least part of the optical electromagnetic radiation emitted by the another optical fibre 710 when reflected following output via the optical launch assembly 202.

In this example, the wavelength selectivity of the dichroic beamsplitter and the another dichroic beamsplitter are selected so that the first wavelength of optical electromagnetic radiation emitted by the source of optical electromagnetic radiation 208, i.e. output by the bidirectional optical transceiver component 200, can be received by the another optical detector 704, i.e. by the another bidirectional optical transceiver component 700. Also, the second wavelength of optical electromagnetic radiation emitted by the another source of optical electromagnetic radiation 702, i.e. output by the another bidirectional optical transceiver component 700, can be received by the optical detector 214, i.e. by the bidirectional optical transceiver component 200.

In the above examples, the optical source 208 emits the optical electromagnetic radiation as a substantially time-invariant signal. However, the optical source 208 can, in this or another example, be arranged to emit the optical electromagnetic radiation as an alternating signal. In this respect, the alternating signal can be a pulsed signal or a modulated signal.

The optical measurement system 100 can be provided as a portable apparatus for personal, industrial or clinical use, for example a hand-held device, or table, desk or bench-top apparatus for a clinical or industrial environment where a clinician or technician can be present.

The above examples are described in the context of a confocal optical system comprising a source and detector that are optically conjugate and an optical discriminator, for example a pinhole. However, the skilled person should appreciate that the bidirectional optical transceiver component 200 and/or the another bidirectional optical transceiver component 700 can be employed in an afocal optical system.

The optical measurement apparatus 102 can be employed in an optical metrology apparatus. The optical measurement apparatus 102 also finds application in the field of interferometry.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

The invention claimed is:

1. An optical measurement apparatus containing a bidirectional optical transceiver component, wherein the bidirectional optical transceiver component comprises:

a housing having a first side wall and a second side wall;
a source of optical electromagnetic radiation sealingly coupled to the first side wall;
an optical detector sealingly coupled to the second side wall;
a beamsplitter; and
a combined input and output port of the housing arranged to permit, when in use, propagation of optical electromagnetic radiation therethrough; and
an optical waveguide sealingly coupled to the combined input and output port at a first end thereof; wherein
the beamsplitter is aligned within the housing with respect to the optical source, the optical detector and the combined input and output port in order to direct optical electromagnetic radiation emitted by the optical source to the combined input and output port and to direct optical electromagnetic radiation received from the combined input and output port to the optical detector; and
the beamsplitter is arranged to direct more than 50% of the received optical electromagnetic radiation from the combined input and output port towards the optical detector.

2. An apparatus as claimed in claim 1, wherein the emitted optical electromagnetic radiation has a first wavelength range associated therewith and received optical electromagnetic radiation has a second wavelength range associated therewith; and the first wavelength range is substantially the same as the second wavelength range.

3. The apparatus according to claim 1, wherein the emitted optical electromagnetic radiation has a first wavelength range associated therewith and the received optical electromagnetic radiation has a second wavelength range associated therewith; and the first and second wavelength ranges are different.

4. An apparatus according to claim 1, further comprising an amplifier circuit operably coupled to the optical detector; and
an offset compensator for compensating for optical crosstalk and/or optical interference, the amplifier circuit being operably coupled to the offset compensator for offset control of the amplifier circuit.

5. The apparatus according to claim 1, wherein the source of electromagnetic radiation is arranged to emit the optical electromagnetic radiation as an alternating signal.

6. The apparatus according to claim 1, further comprising another bidirectional optical transceiver component operably coupled to the bidirectional optical transceiver component.

7. The apparatus according to claim 1, further comprising screening of the bidirectional optical transceiver component to reduce optical and/or electrical noise, thereby maximising sensitivity of the bidirectional optical transceiver component to an optical signal.

8. An apparatus according to claim 1, wherein the beamsplitter is arranged to direct more than 80% of the received optical electromagnetic radiation from the combined input and output port towards the optical detector.

9. An optical metrology apparatus comprising the optical measurement apparatus as claimed in claim 1.

10. The apparatus according to claim 3, wherein the beamsplitter is arranged to direct optical electromagnetic radiation in the second wavelength range towards the optical detector and direct optical electromagnetic radiation in the first wavelength range away from the optical detector.

11. The apparatus according to claim 1, wherein an optical launch assembly is disposed at a second end of the optical waveguide.

12. The apparatus according to claim 11, wherein the optical launch assembly comprises a length of propagation medium abutting the second end of the optical waveguide.

13. The apparatus according to claim 1, wherein the second end of the optical waveguide is terminated by a polished surface in a plane substantially perpendicular to a longitudinal axis of the optical waveguide; a first end of the length of propagation medium is terminated by a polished surface in a plane substantially perpendicular to a longitudinal axis of the length of propagation medium; and the second end of the optical waveguide snugly abuts the first end of the length of propagation medium.

14. The apparatus according to claim 1, wherein a second end of the optical waveguide has a surface that extends at a substantially non-perpendicular angle with respect to a longitudinal axis of the optical waveguide.

15. The apparatus according to claim 12, wherein a refractive index of the length of propagation material is arranged substantially to match a refractive index of the optical waveguide.

16. The apparatus according to claim 12, wherein the optical launch assembly comprises a split sleeve substantially surrounding a portion of the length of propagation medium and the second end of the optical waveguide.

17. The apparatus according to claim 12, wherein a joint between the optical waveguide and the length of propagation material is filled with an index matching medium.

18. The apparatus according to claim 4, wherein the offset compensator is arranged to receive an electrical feedback signal from the amplifier circuit and to adjust, when in use, an offset level applied to the amplifier circuit by the offset compensator.

19. The apparatus according to claim 6, wherein an optical waveguide is coupled to the combined input and output port at a first end thereof; and the another bidirectional optical transceiver component comprises another combined input and output port and another optical waveguide coupled thereto at a first end thereof.

20. The apparatus according to claim 1, further comprising another bidirectional optical transceiver component comprising another detector, another beamsplitter, another combined input and output port and another optical waveguide coupled the another combined input and output port; wherein the optical waveguide is in optical communication with the source of electromagnetic radiation and the optical detector via the beamsplitter; the another optical waveguide is in optical communication with the another optical detector via the another beamsplitter; and the optical waveguide is arranged to receive, when in use, optical electromagnetic radiation from the source of electromagnetic radiation and permit propagation therethrough, and the another optical waveguide is arranged to receive at least part of the optical electromagnetic radiation emitted by the optical waveguide when reflected.

21. A method of manufacturing an optical measurement apparatus, the method comprising:
providing an optical measurement assembly;
coupling a bidirectional optical transceiver component to the optical measurement assembly, the bidirectional optical transceiver component comprising:
    a housing having a first side wall and a second side wall
    a source of electromagnetic radiation sealingly coupled to the side wall;

an optical detector sealigly coupled to the second side wall;
a combined input and output port of the housing arranged to permitpropagation of optical electromagnetic radiation therethrough; and
a beamsplitter; wherein
the beamsplitter is arranged to direct more than 50% of an optical electromagnetic radiation received from the combined input and output port towards the optical detector.

* * * * *